United States Patent [19]

Sorice

[11] 3,887,974

[45] June 10, 1975

[54] CUTTING INSERT AND HOLDER THEREFOR

[75] Inventor: Edward L. Sorice, Crabtree, Pa.

[73] Assignee: Kennametal Inc., Latrobe, Pa.

[22] Filed: Aug. 1, 1974

[21] Appl. No.: 493,560

[52] U.S. Cl. .................................. 29/95 R; 29/96
[51] Int. Cl. ............................................ B26d 1/00
[58] Field of Search .................................. 29/95, 96

[56] References Cited
UNITED STATES PATENTS

| | | | |
|---|---|---|---|
| 3,125,798 | 3/1964 | Stein .................................. | 29/95 X |
| 3,156,032 | 11/1964 | Lundgren ........................... | 29/95 X |
| 3,220,088 | 11/1965 | Brundin et al. ..................... | 29/95 X |
| 3,653,107 | 4/1972 | Hertel ................................. | 29/95 X |

*Primary Examiner*—Leonidas Vlachos
*Attorney, Agent, or Firm*—Melvin A. Crosby

[57] ABSTRACT

The present invention relates to a cutting insert and a holder therefor in which the insert is transferrable from a righthand holder to a lefthand holder which is a mirror image of the righthand holder by reversing the insert end for end. The insert, thus, has a cutting insert on each end with a respective cutting edge being usable in each of the said righthand and lefthand holders.

The insert is relatively elongated with the cutting edges in the ends and the holder has an elongated pocket open on the top and on one side and toward one end in the bottom wall of the insert inclines downwardly toward the closed side of the pocket in the holder and is held in place in the pocket by a clamp member having end portions engaging the holder and a groove in the insert and held on the holder by a central clamp screw.

9 Claims, 7 Drawing Figures

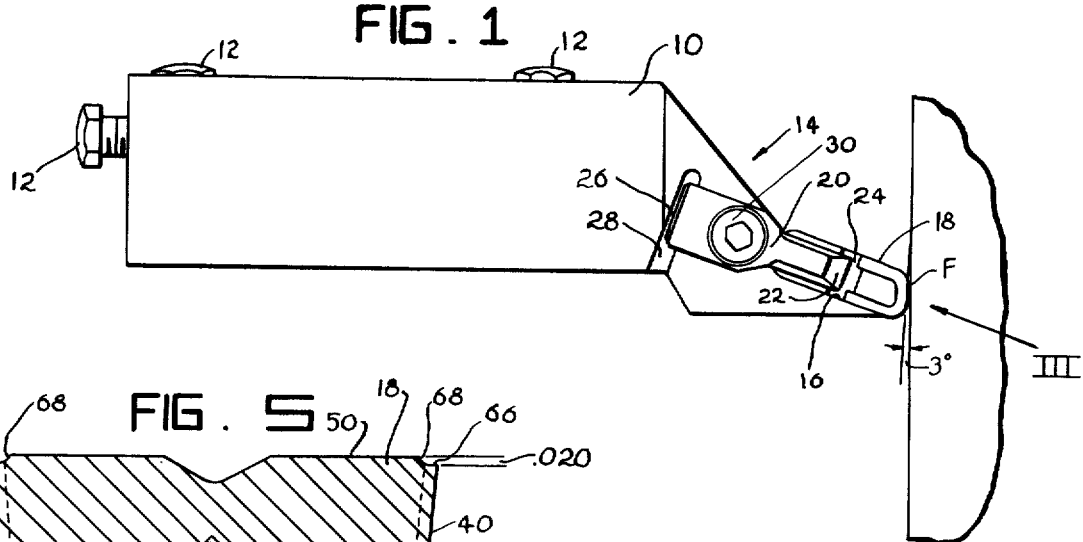
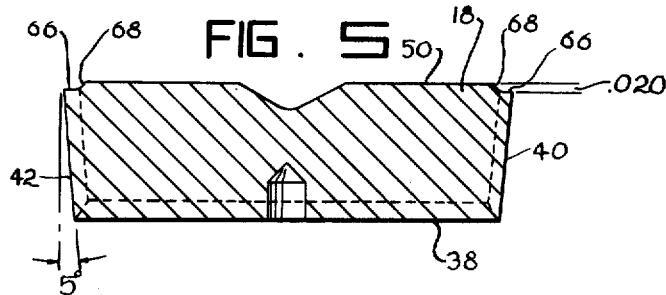
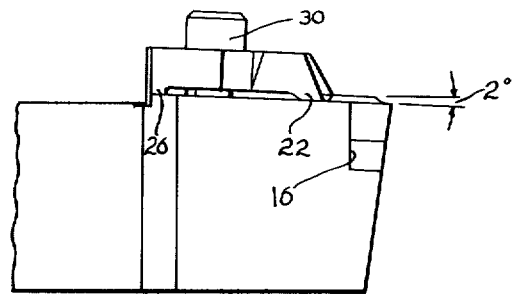
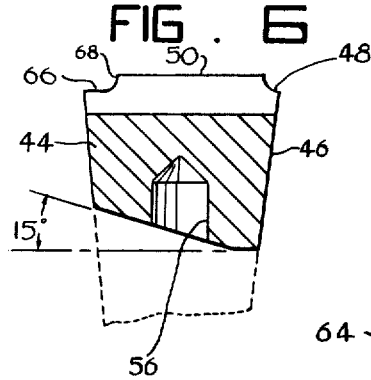
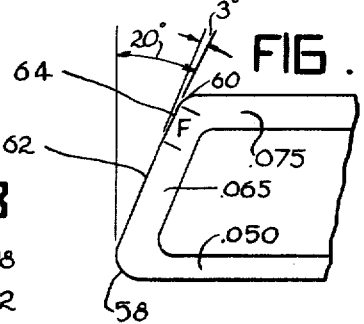
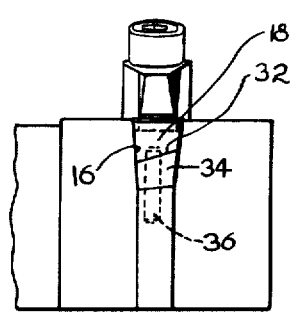
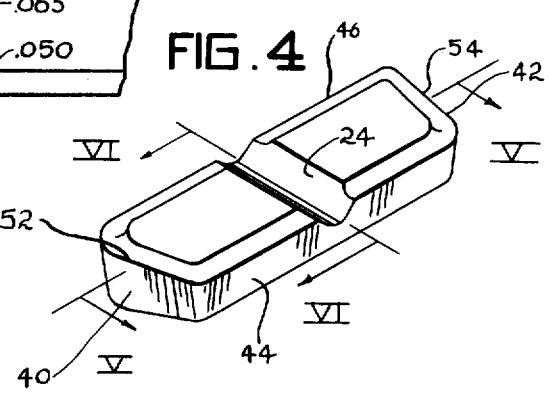

3,887,974

CUTTING INSERT AND HOLDER THEREFOR

The present invention relates to cutting inserts and holders therefor and is particularly concerned with an insert configuration and is usable in both righthanded and lefthanded holders merely by inverting the insert end for end.

A number of instances occur where a work member has surfaces thereon which are best machined by machining certain surfaces with a righthand holder and certain other surfaces with a lefthand holder. For example, the journal portions at opposite ends of a support shaft for railroad car wheels are best machined with respective holders of respective opposite hands.

Also, both sides of a flange to be machined can advantageously be machined with a righthand holder on one side and a lefthand holder on the opposite side. Some of the surfaces referred to require extremely good finishes thereon such as, for example, the journals on the shaft for railroad car wheels.

To obtain such a finish, such finishes are best carried out by a cutting edge extending substantially parallel to the surface being machined whereby, instead of the cutting insert taking an extremely fine thread-like cut, it takes a rather broad thin chip and the resulting surface is, accordingly, relatively smooth.

BRIEF SUMMARY OF THE INVENTION

According to the present invention, a tool holder is provided having a relatively narrow projection on one end with an insert receiving pocket formed into the side of the projection. The pocket is relatively long in longitudinal direction and relatively narrow in the transverse direction and is adapted for receiving a correspondingly shaped cutting insert and with one end of the insert protruding from the open end of the pocket.

The longitudinal axis of the insert is inclined to the longitudinal axis of the holder when the holder and insert combination is viewed in plan and the cutting edge on the protruding end of the insert extends substantially perpendicularly to the longitudinal axis of the holder. The insert is symmetrical about a central transverse axis and when turned end for end can be inserted in the pocket of another holder which is the mirror image of the holder referred to above.

An objective of the present invention is the provision of an improved holder and insert combination, especially for finishing operations, in which the insert is invertable end for end for selectively carrying out righthand turning operations and lefthand turning operations.

Another objective is the provision of an insert especially constructed for use in both righthand and lefthand turning operations when mounted in respective holders.

A further object is the provision of a cutting insert in a holder therefor in which the insert is extremely firmly clamped in the holder with a minimum amount of overhang of the holder beneath the insert.

The objectives referred to above as well as still other objects and advantages of the present invention will become more apparent upon reference to the following detailed specification taken in connection with the accompanying drawings in which:

FIG. 1 is a plan view of a holder and insert combination according to the present invention.

FIG. 2 is a side view of the righthand end of the cutting insert and holder combination of FIG. 1.

FIG. 3 is an end view looking in in the direction of the arrow 3 on FIG. 1.

FIG. 4 is a perspective view showing the cutting insert.

FIG. 5 is a longitudinal section through the insert indicated by line V—V on FIG. 4 and drawn at enlarged scale.

FIG. 6 is a transverse section through the insert as indicated by line VI—VI on FIG. 1 and also drawn at enlarged scale.

FIG. 7 is a fragmentary plan view showing in detail the configuration of one of the cutting ends of the insert.

DETAILED DESCRIPTION OF THE INVENTION:

Referring to the drawings more in detail, the holder in FIG. 1 comprises a bar-like member 10 having adjustable or fixed abutment means 12 thereon for location of the holder in a pocket provided therefor in a machine tool. One end of the holder generally designated 14 protrudes outwardly and is formed with a pocket 16 for receiving a cutting insert 18.

The pocket 16 is open toward the top and toward the right end of the holder and toward the back and is relatively elongated in the direction of the length thereof. The insert 18 is correspondingly elongated and is received in the pocket in engagement with the rear wall thereof and with the side wall and bottom wall and is fixedly held in place in the pocket by clamp member 20.

Clamp member 20 has a dependent nose portion 22 at the insert end receivable in a transverse groove 24 provided in the top wall of the insert and at the other end has a protrusion 26 receivable in a recess 28 in the holder which is parallel with groove 24 when the insert is positioned in the pocket.

A clamp screw 30 extends through clamp member 20 and is threaded into the holder and when tightened up will pull clamp member downwardly into firm engagement with the recess 28 at one end of the clamp member and with groove 24 in the insert at the other end of the clamp member.

The pocket 16 in the holder has a bottom wall 32 which inclines downwardly toward the closed side of pocket 16 and which is formed by the upper surface of the shim member 34. The shim member is advantageously located on the holder by a locating pin 36 which may extend completely through the shim member 34 and into a hole in the bottom of insert 18.

An advantage of pin 36 is that it keeps shim 34 in place and prevents the shim from moving toward the open side or open end of the pocket when the insert is clamped tight in the pocket. Such shifting of the shim might occur under conditions of extreme vibration or heavy loading or the like. Pin 36 prevents this and, likewise, may assist in preliminarily locating the insert 18 in the pocket.

The pocket 16, as viewed in FIG. 3, has the wall on the left side on an incline and the bottom wall perpendicular thereto. The shim 34, as viewed in FIG. 3, has the lower left hand corner formed to a right angle while the top wall of the shim is inclined from side to side to engage the bottom wall of insert 18. The pocket 16 is open at the end and on the right side in FIG. 3 and pin 38 prevents the shim 34 from moving when the insert is clamped in place.

The insert 18 takes the form of a body of hard wear resistant material, such as a body comprising cemented hard metal carbide; tungsten carbide, for example. The body of the insert 18 tapers outwardly in the upward direction from the inclined bottom wall 38 of the insert. The body, in addition to inclined bottom wall 38, has end walls 40 and 42, side walls 44 and 46 and has a top wall 48 disposed in a plane which intersects the planes of the side and end walls of the insert.

Upstanding from the central region of top wall 48 is a flat island area 50 which terminates short of the side and end walls of the insert but, in particular, terminates short of the end walls of the insert and which end walls form the cutting regions 52 and 54 at the junctures thereof with the plane of top wall 48.

As will be seen particularly in FIGS. 4 and 7, the side wall 44 of the body is shorter than side wall 46 while the end walls 40 and 42 converge from the longer wall 46 toward the shorter wall 44. In the middle of the length of the insert, there is disposed the aforementioned transverse groove 24 which cooperates with clamp member 20 for clamping the insert in pocket 16.

The top wall 48 forms a land area or land region around the insert extending completely around the insert except where the land region is interrupted by groove 24 and which land region is thinner adjacent the longer side wall of the insert, is somewhat thicker adjacent the end walls 40 and 42 of the insert and is widest adjacent the shorter side wall 44 of the insert.

The insert is provided with the central hole 56 extending upwardly into the insert from beneath in about the geometric center of the insert for holding the insert during grinding thereof when the insert is manufactured.

As to the cutting edges of the insert, one of which is indicated at 52 in FIG. 4, and the other of which is indicated at 54 in the same figure, the cutting edges are identical except that one thereof forms the mirror image of the other so that the insert can be inverted end for end and do righthand turning in a righthand holder and lefthand turning in the lefthand holder which is the mirror image of a righthand holder.

The insert, when viewed in plan, has rounded corners as at 58 and 60, at the opposite ends of the cutting edges and the cutting edge proper comprising a minor linear portion 64 extending partway across the end of the insert from rounded corner 60. A major linear portion 62 on the end of the insert leading away from rounded corner 58 forms a clearance region.

Minor portion 64, for example, makes an angle of 20° with the longitudinal axis of the insert as indicated in FIG. 7, and major portion 62 makes an included angle of about 177° with minor portion 64 and thereby makes an angle of about 17° with the longitudinal axis of the insert.

The longitudinal axis of pocket 16 is offset angularly from the longitudinal axis of holder 10 to 20° so that the minor portion 64 of the cutting edge is parallel to the surface being cut whereas the major portion 62 of the cutting edge diverges therefrom at an angle of about 3°. Cutting of a surface proceeds in the downward direction as the insert and holder is viewed in FIG. 1 and, thus, the principal cutting of the surface is by the minor portion 64 with the portion 62 diverging from the surface being machined.

The aforementioned land regions which extends around the periphery of the insert, especially at the cutting edges of the insert, comprises a flat portion 66 extending inwardly from each cutting edge of the insert and a fillet 68 at the inner edge of the land region curving upwardly toward the plane of the island area 50 which upstands from the plane of the top wall of the insert.

The insert is, in the aforesaid manner, provided with a chipbreaker region at the periphery of the island area which is not depressed below the cutting edge of the insert. Manufacture of the insert is thereby simplified and necessary grinding operations can easily be carried out.

Modifications may be made within the scope of the appended claims.

What is claimed is:

1. A cutting insert comprising: a body of hard wear resistant material having top and bottom and side and end walls, said side walls being parallel and longer than said end walls and said body being symmetrical about an axis perpendicular to said side walls when viewed in plan, one of the longer side walls being shorter than the other thereof whereby said end walls converge toward one side wall of said body, each end wall of the body forming a cutting edge at the junction thereof with the said top wall of the body, said top wall having a flat island area upstanding thereon which at the ends is spaced inwardly from said cutting edges, a land region in the plane of said top wall extending inwardly from each cutting edge, and a fillet at the inner edge of each land region leading upwardly to the plane of said island area.

2. A cutting insert according to claim 1 in which said bottom wall is inclined upwardly from one side of said body toward the other side thereof.

3. A cutting insert according to claim 1 in which said insert has a groove extending transversely thereacross from one said side wall to the other in about the middle of the length thereof.

4. A cutting insert according to claim 1 in which the corners of said body when viewed in plan are rounded.

5. A cutting insert according to claim 4 in which each cutting edge comprises a longer linear portion adjacent the longer side of the body and shorter linear portion adjacent the shorter side of the body, said portions forming an obtuse included angle therebetween.

6. A cutting insert according to claim 1 in which said island area at the sides terminates inwardly from the side walls of the body, said land region extending completely around said body in the plane of said top wall, and a groove extending laterally across said top wall of said body in the middle of the length of the insert from one side wall of the insert to the other and at the ends interrupting said land region.

7. A cutting insert according to claim 1 in which said body tapers outwardly in the upward direction on all sides.

8. A cutting insert according to claim 6 in which said body is symmetrical about a plane perpendicular to the plane of said top wall and passing through the center of said groove, said body tapering outwardly toward the top on all sides, the bottom wall of said insert inclining upwardly from the longer side wall of said body toward the shorter side wall thereof.

9. A cutting insert according to claim 8 in which said groove is an upwardly opening wide angle "V" groove.

* * * * *